US006262395B1

(12) United States Patent
Coleman

(10) Patent No.: US 6,262,395 B1
(45) Date of Patent: Jul. 17, 2001

(54) ELECTRIC OVEN

(75) Inventor: Gavin John Coleman, Bromsgrove (GB)

(73) Assignee: Ceramaspeed Limited (GB)

(*) Notice: Subject to any disclaimer, the term of this patent is extended or adjusted under 35 U.S.C. 154(b) by 0 days.

(21) Appl. No.: 09/666,956

(22) Filed: Sep. 20, 2000

(30) Foreign Application Priority Data

Oct. 6, 1999 (GB) ........................................ 9923504

(51) Int. Cl.[7] ........................ A21B 3/10; F24L 15/36

(52) U.S. Cl. .................... 219/407; 219/391; 392/408

(58) Field of Search ........................ 219/391, 406, 219/407, 522; 392/408

(56) References Cited

U.S. PATENT DOCUMENTS

| | | | | |
|---|---|---|---|---|
| 2,752,477 | | 6/1956 | Norris . | |
| 4,430,541 | * | 2/1984 | Day, Jr. | 219/683 |
| 4,761,529 | * | 8/1988 | Tsisios | 219/685 |
| 4,771,154 | * | 9/1988 | Bell et al. | 219/685 |
| 6,188,048 | * | 2/2001 | Wilkins et al. | 392/435 |

FOREIGN PATENT DOCUMENTS

| | | |
|---|---|---|
| 2831804 | 2/1979 | (DE) . |
| 3404430 | 8/1985 | (DE) . |
| 9109220 | 11/1991 | (DE) . |
| 0918448 | 5/1999 | (EP) . |

OTHER PUBLICATIONS

English Language EPODOC Abstract of DE 3404430.

* cited by examiner

*Primary Examiner*—Joseph Pelham
(74) *Attorney, Agent, or Firm*—Ira S. Dorman

(57) ABSTRACT

An electric oven (1) has an oven cavity (2) for receiving one or more items to be heated, and a radiant electric heater (3) incorporating at least one heating element (6). The heater (3) is supported at a wall (4) of the cavity and has a face (5) directed towards the cavity (2) for radiating heat into the cavity from the at least one heating element (6). The face (5) of the heater is covered by a light-permeable sheet (10) spaced from the heating element (6), the sheet being in the form of a fabric which may comprise filaments or a lattice of glass, ceramic, or metal. An electric lamp (13) is provided behind the sheet (10) and additional to the at least one heating element (6) and is arranged to provide illumination of the oven cavity (2) through the sheet.

25 Claims, 1 Drawing Sheet

ELECTRIC OVEN

This invention relates to an electric oven having an oven cavity for receiving one or more items, such as food items, to be heated and in which one or more electrical resistance heating elements are provided and also means to illuminate the oven cavity.

BACKGROUND TO THE INVENTION

Such ovens are known, in which the one or more electrical resistance heating elements comprise one or more radiant electric heating elements which may be provided as the sole source of heating, or may be provided as an additional source of heating, such as in microwave ovens. Such one or more heating elements may be incorporated in one or more heaters located at a wall of the oven cavity.

It is a general requirement in such ovens to provide an electric light source for illuminating the oven cavity during operation of the oven and/or at other times, such as when the oven door is open. Such a light source, in the form of a filament lamp operated at mains voltage, has hitherto been provided as a separate installation from the heating element or elements, typically being located as a unit recessed into an aperture in a wall of the oven cavity and requiring some form of protective covering.

OBJECT OF THE INVENTION

It is an object of the present invention to provide an electric oven in which such a separate installation for an electric light source for illuminating the oven cavity is not required.

SUMMARY OF THE INVENTION

According to the present invention there is provided an electric oven having an oven cavity for receiving an item to be heated, a radiant electric heater incorporating at least one heating element and supported at a wall of the cavity and having a face directed towards the cavity for radiating heat into the cavity from the at least one heating element, the face of the heater being covered by a light-permeable sheet spaced from the heating element, the sheet being in the form of a fabric, and electric lamp means incorporated in the heater behind the sheet and additional to the at least one heating element so as to provide illumination of the oven cavity through the sheet.

The fabric may comprise filaments or a lattice of glass, ceramic, or metal.

The electric lamp means may be operated independently of the at least one heating element.

The electric lamp means may be provided at a substantially central location in the heater.

The heater may be provided with a base relative to (on or adjacent to) which the at least one heating element is supported, the base having an aperture therein for receiving the electric lamp means.

The base may comprise or contain thermal insulation material, such as microporous thermal insulation material.

Peripheral wall means may be provided, separate from or integral with the base, the light-permeable sheet being arranged to overlie the wall means.

Thermal insulation means may be provided to shield the electric lamp means from heat from the at least one heating element. Such thermal insulation means may be arranged to at least partially border the electric lamp means and may comprise bound vermiculite, or microporous thermal insulation material, or a mixture of microporous thermal insulation material with one or more granular materials such as vermiculite.

The thermal insulation means may be of substantially tubular form.

The electric lamp means may comprise a filament lamp.

The electric lamp means may operate at substantially the same voltage as the at least one heating element.

An apertured member may be provided overlying the light-permeable sheet. Such apertured member may comprise a perforated sheet, or a lattice arrangement, of metal or ceramic.

When the fabric of the light-permeable sheet comprises glass or ceramic filaments, these may be of woven, knitted or mat form in the fabric.

When the fabric of the light-permeable sheet comprises metal filaments, these may be of loosely woven or knitted form in the fabric.

When the fabric of the light-permeable sheet comprises a lattice, this may be of pressed or expanded form, particularly of metal.

It would have been considered that the presence of the fabric sheet would result in insufficient illumination of the oven cavity. Surprisingly this is not so.

For a better understanding of the present invention and to show more clearly how it may be carried into effect reference will now be made, by way of example, to the accompanying drawings in which:

DESCRIPTION OF PREFERRED EMBODIMENT

Figure 1:
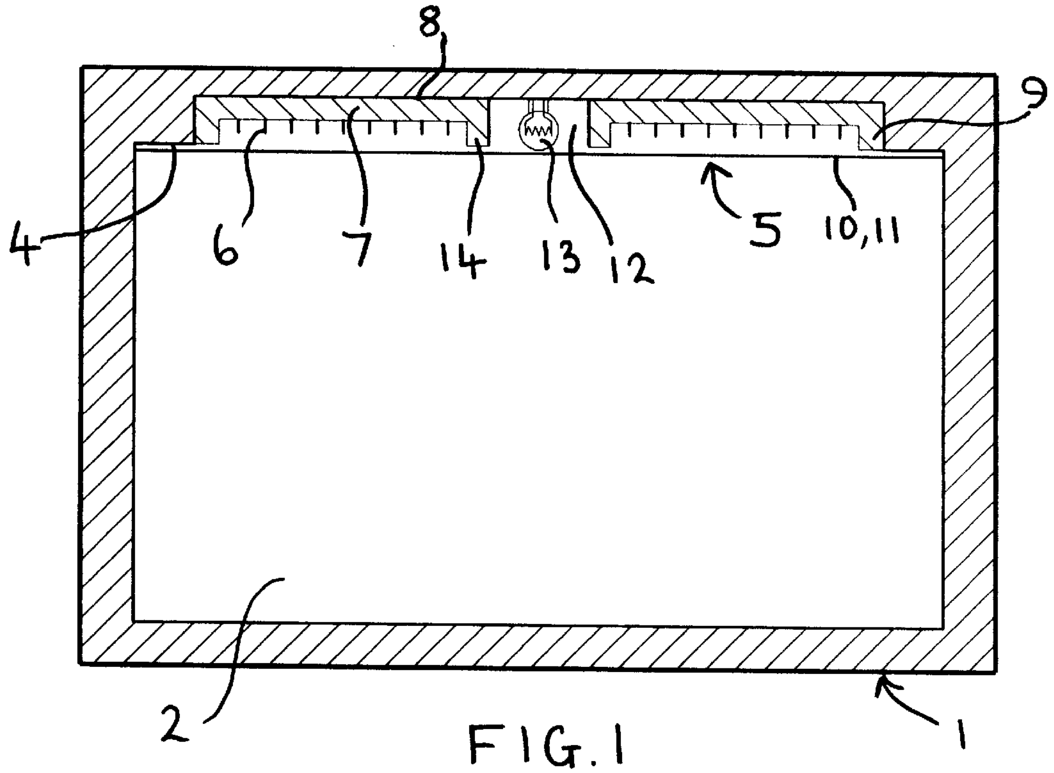
FIG. 1 is a cross-sectional view of an electric oven with a radiant heater according to the present invention.
Figure 2:
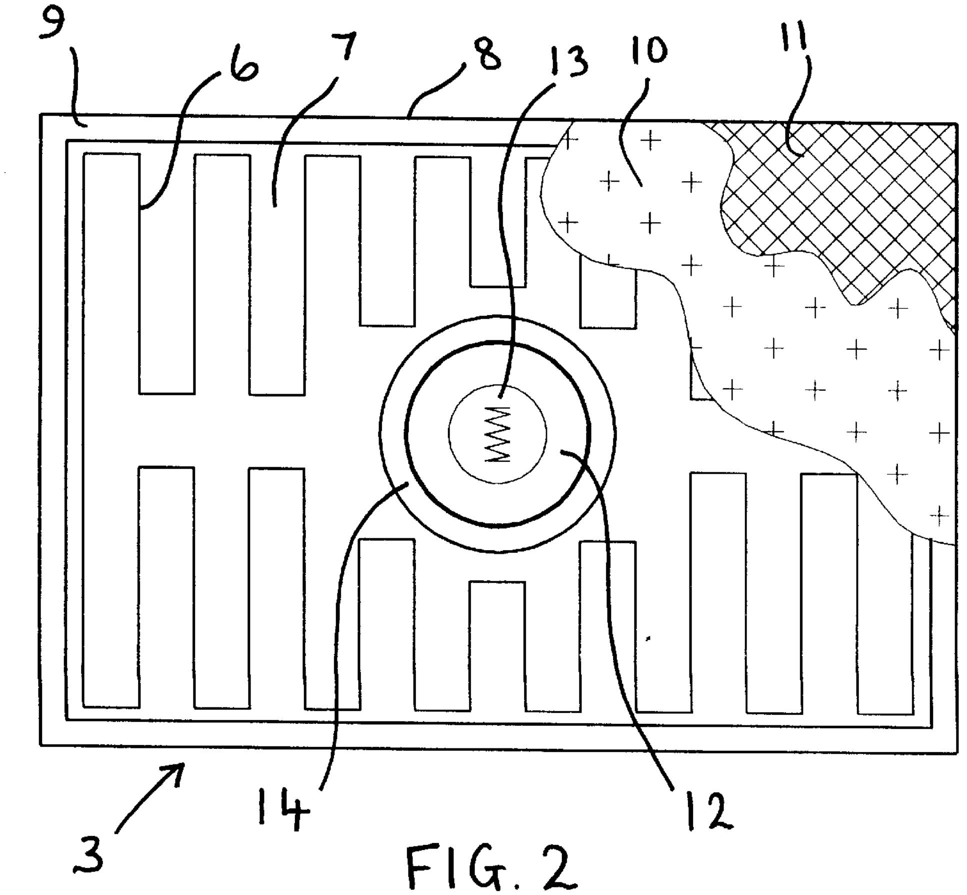
FIG. 2 is a plan view of the radiant heater in the oven of FIG. 1.

Referring to the drawings, an electric oven 1, which may be a microwave oven, or any other form of oven, particularly for heating one or more food items, has a cavity 2 for receiving the item or items to be heated.

A radiant electric heater 3 is supported at a wall 4 of the oven cavity and has a face 5 directed towards the cavity for radiating heat into the cavity. Heat is arranged to be radiated from at least one electric heating element 6 which is supported relative to a base layer 7 of insulation material, such as microporous thermal and electrical insulation material. The base layer 7 of insulation material is provided in a metal dish-like support 8.

The at least one heating element 6 suitably comprises a corrugated metal ribbon supported on edge on the base layer 7 and suitably secured thereto by partial embedding or by other means. Other forms of heating element may be considered, such as coiled wire or lamp forms and combinations of different forms of heating element could be used.

A peripheral wall 9 of thermal insulation material is provided. As shown this is integral with the base layer 7, although it could be separate therefrom.

The face 5 of the heater is covered by a light-permeable fabric sheet 10, comprising filaments or a lattice of glass, ceramic, or metal and overlying the wall 9. Filaments of S2 glass are particularly suitable for this purpose. Glass or ceramic filaments may be provided of woven, knitted or mat form in the fabric. When metal filaments are used, they are arranged of loosely woven or knitted form in the fabric to provide apertures through which light radiation may pass. A lattice of pressed or expanded material form, particularly of metal, may also be used to form the fabric sheet 10. Fabric materials for use with the heater in the oven of the present invention are described in EP-A-0 918 448.

An apertured sheet 11, such as a perforated sheet or a lattice arrangement of metal or ceramic may additionally be provided overlying the light-permeable fabric sheet 10. Such apertured sheet 11 when of metal may be used, for example, to provide electrical screening, particularly in a microwave oven.

An aperture 12 is provided through the dish-like support 8 and the base layer 7 at a central region of the heater. An electric filament lamp 13, mounted in a suitable socket, is arranged inside the heater in the aperture 12. The lamp 13 is suitably operated at mains voltage, from the same source as the heating element or elements 6. The lamp 13 is shielded from direct heat from the heating element or elements 6 by being at least partially bordered by thermal insulation material such as an effectively tubular arrangement 14 of thermal insulation material. Such thermal insulation material may be integral with, or separate from, the base layer 7 and may comprise microporous insulation material, or bound vermiculite, or a mixture of microporous insulation material and one or more granular materials such as vermiculite.

The lamp 13 may be energised together with, or independently of, the heating element or elements 6 and illuminates the oven cavity 2 through the light-permeable fabric sheet 10 and the apertures in the optional apertured sheet 11. Surprisingly, adequate illumination of the oven cavity 2 is obtained.

What is claimed is:

1. An electric oven having an oven cavity for receiving an item to be heated, a radiant electric heater incorporating at least one heating element and supported at a wall of the cavity and having a face directed towards the cavity for radiating heat into the cavity from the at least one heating element, the face of the heater being covered by a light-permeable sheet spaced from the heating element, the sheet being in the form of a fabric, and electric lamp means incorporated in the heater behind the sheet and additional to the at least one heating element so as to provide illumination of the oven cavity through the sheet.

2. An electric oven according to claim 1, wherein the fabric comprises material selected from filaments and a lattice selected from glass, ceramic, and metal.

3. An electric oven according to claim 1, wherein the electric lamp means is operated independently of the at least one heating element.

4. An electric oven according to claim 1, wherein the electric lamp means is provided at a substantially central location in the heater.

5. An electric oven according to claim 1, wherein the heater is provided with a base relative to which the at least one heating element is supported, the base having an aperture therein for receiving the electric lamp means.

6. An electric oven according to claim 5, wherein the base comprises or contains thermal insulation material.

7. An electric oven according to claim 6, wherein the thermal insulation material comprises microporous thermal insulation material.

8. An electric oven according to claim 5, wherein peripheral wall means is provided, the light-permeable sheet being arranged to overlie the wall means.

9. An electric oven according to claim 8, wherein the peripheral wall means is separate from the base.

10. An electric oven according to claim 8, wherein the peripheral wall means is integral with the base.

11. An electric oven according to claim 1, wherein thermal insulation means is provided to shield the electric lamp means from heat from the at least one heating element.

12. An electric oven according to claim 11, wherein the thermal insulation means is arranged to at least partially border the electric lamp means.

13. An electric oven according to claim 11, wherein the thermal insulation means is selected from bound vermiculite, microporous thermal insulation material, and a mixture of microporous thermal insulation material with granular material.

14. An electric oven according to claim 13, wherein the granular material comprises vermiculite.

15. An electric oven according to claim 12, wherein the thermal insulation means is of substantially tubular form.

16. An electric oven according to claim 1, wherein the electric lamp means comprises a filament lamp.

17. An electric oven according to claim 1, wherein the electric lamp means operates at substantially the same voltage as the at least one heating element.

18. An electric oven according to claim 1, wherein an apertured member is provided overlying the light-permeable sheet.

19. An electric oven according to claim 18, wherein the apertured member is selected from a perforated sheet and a lattice arrangement.

20. An electric oven according to claim 19, wherein the material of the apertured member is selected from metal and ceramic.

21. An electric oven according to claim 20, wherein the fabric of the light-permeable sheet is selected from glass and ceramic filaments.

22. An electric oven according to claim 21, wherein the filaments are selected from woven, knitted and mat form in the fabric.

23. An electric oven according to claim 1, wherein the fabric of the light-permeable sheet comprises metal filaments, which are of loosely woven or knitted form in the fabric.

24. An electric oven according to claim 1, wherein the fabric of the light-permeable sheet comprises a lattice selected from pressed and expanded form.

25. An electric oven according to claim 24, wherein the lattice comprises metal.

* * * * *